United States Patent
Levy (10) Patent No.: US 8,234,495 B2
(45) Date of Patent: Jul. 31, 2012

(54) DIGITAL WATERMARKING WITH VARIABLE ORIENTATION AND PROTOCOLS

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 15 days.

(21) Appl. No.: 12/145,373

(22) Filed: Jun. 24, 2008

(65) Prior Publication Data

US 2009/0031134 A1  Jan. 29, 2009

Related U.S. Application Data (63) Continuation of application No. 10/866,172, filed on Jun. 10, 2004, now Pat. No. 7,392,394, which is a continuation-in-part of application No. 10/017,677, filed on Dec. 13, 2001, now Pat. No. 7,392,392.

(60) Provisional application No. 60/478,386, filed on Jun. 13, 2003.

(51) Int. Cl.
G06T 1/00 (2006.01)
(52) U.S. Cl. .................................. 713/176; 358/3.28
(58) Field of Classification Search ................ 358/3.28; 713/176
See application file for complete search history.

(56) References Cited

U.S. PATENT DOCUMENTS

| | | | |
|---|---|---|---|
| 4,807,031 A | 2/1989 | Broughton et al. | |
| 4,969,041 A | 11/1990 | O'Grady et al. | |
| 5,404,377 A | 4/1995 | Moses | |
| 5,526,427 A | 6/1996 | Thomas et al. | |
| 5,664,018 A | 9/1997 | Leighton | |
| 5,671,277 A | 9/1997 | Ikenoue et al. | |
| 5,774,452 A | 6/1998 | Wolosewicz | |
| 5,809,139 A | 9/1998 | Girod et al. | |
| 5,828,325 A | 10/1998 | Wolosewicz et al. | |
| 5,832,119 A | 11/1998 | Rhoads | |
| 5,835,639 A | 11/1998 | Honsinger et al. | |
| 5,892,900 A | 4/1999 | Ginter et al. | |
| 5,905,800 A | 5/1999 | Moskowitz et al. | |
| 5,963,909 A | 10/1999 | Warren et al. | |
| 6,122,403 A * | 9/2000 | Rhoads | 382/233 |
| 6,141,441 A | 10/2000 | Cass et al. | |
| 6,145,081 A | 11/2000 | Winograd et al. | |
| 6,198,832 B1 | 3/2001 | Maes et al. | |
| 6,205,249 B1 | 3/2001 | Moskowitz | |
| 6,219,634 B1 * | 4/2001 | Levine | 704/200.1 |
| 6,226,387 B1 | 5/2001 | Tewfik et al. | |

(Continued)

FOREIGN PATENT DOCUMENTS

EP  789480  8/1997

(Continued)

OTHER PUBLICATIONS

Schneier (Bruce Schneier, "Applied Cryptography, Protocols, Algorithms and Source Code in C", 2nd edition, 1996 ISBN 0471128457), p. 421-428.*

(Continued)

*Primary Examiner* — Peter Poltorak (57) ABSTRACT

A method of digital watermarking selects a mapping of a digital watermark to audio or video content and an embedding gain to produce uniquely watermarked copies for distribution. The embedding method is implemented at points of distribution, including content servers or receivers. By applying varying mapping protocols and random gain, the digital watermark uniquely serializes copies. It also has a structure and embedding configuration that minimizes the effectiveness of collusion, averaging and over-embedding attacks.

9 Claims, 4 Drawing Sheets

U.S. PATENT DOCUMENTS

| | | | |
|---|---|---|---|
| 6,233,684 B1 | 5/2001 | Stefik et al. | |
| 6,240,121 B1* | 5/2001 | Senoh | 375/130 |
| 6,249,870 B1 | 6/2001 | Kobayashi et al. | |
| 6,272,634 B1 | 8/2001 | Tewfik et al. | |
| 6,285,774 B1 | 9/2001 | Schumann et al. | |
| 6,332,194 B1 | 12/2001 | Bloom et al. | |
| 6,345,256 B1 | 2/2002 | Milsted et al. | |
| 6,353,672 B1 | 3/2002 | Rhoads | |
| 6,359,985 B1 | 3/2002 | Koch et al. | |
| 6,370,272 B1 | 4/2002 | Shimizu | |
| 6,373,960 B1* | 4/2002 | Conover et al. | 382/100 |
| 6,381,341 B1 | 4/2002 | Rhoads | |
| 6,404,898 B1 | 6/2002 | Rhoads | |
| 6,425,081 B1 | 7/2002 | Iwamura | |
| 6,427,012 B1 | 7/2002 | Petrovic | |
| 6,430,301 B1* | 8/2002 | Petrovic | 382/100 |
| 6,456,726 B1 | 9/2002 | Yu et al. | |
| 6,522,769 B1 | 2/2003 | Rhoads et al. | |
| 6,560,350 B2 | 5/2003 | Rhoads | |
| 6,700,989 B1 | 3/2004 | Itoh et al. | |
| 6,711,276 B1 | 3/2004 | Yoshiura et al. | |
| 6,718,047 B2 | 4/2004 | Rhoads | |
| 6,771,795 B1 | 8/2004 | Isnardi | |
| 6,775,655 B1* | 8/2004 | Peinado et al. | 705/59 |
| 6,785,401 B2 | 8/2004 | Walker | |
| 6,789,108 B1 | 9/2004 | McMillan | |
| 6,801,999 B1* | 10/2004 | Venkatesan et al. | 713/167 |
| 6,834,345 B2 | 12/2004 | Bloom et al. | |
| 6,839,673 B1* | 1/2005 | Choi et al. | 704/273 |
| 6,856,977 B1 | 2/2005 | Adelsbach et al. | |
| 6,901,514 B1 | 5/2005 | Iu et al. | |
| 6,921,315 B2* | 7/2005 | Kownacki | 446/162 |
| 7,006,555 B1 | 2/2006 | Srinivasan | |
| 7,113,614 B2 | 9/2006 | Rhoads | |
| 7,181,022 B2 | 2/2007 | Rhoads | |
| 7,359,528 B2 | 4/2008 | Rhoads | |
| 7,391,881 B2 | 6/2008 | Sharma | |
| 7,483,547 B2 | 1/2009 | Hannigan et al. | |
| 7,486,799 B2 | 2/2009 | Rhoads | |
| 7,756,892 B2 | 7/2010 | Levy | |
| 2001/0009581 A1 | 7/2001 | Hashimoto | |
| 2001/0025341 A1* | 9/2001 | Marshall | 713/176 |
| 2001/0028715 A1 | 10/2001 | Watanabe | |
| 2001/0044899 A1 | 11/2001 | Levy | |
| 2002/0021808 A1 | 2/2002 | Iwamura | |
| 2002/0071593 A1* | 6/2002 | Muratani | 382/100 |
| 2002/0076048 A1 | 6/2002 | Hars | |
| 2002/0078178 A1* | 6/2002 | Senoh | 709/219 |
| 2002/0097891 A1 | 7/2002 | Hinishi | |
| 2002/0168087 A1 | 11/2002 | Petrovic | |
| 2002/0191810 A1 | 12/2002 | Fudge et al. | |
| 2003/0000971 A1 | 1/2003 | Nielsen | |
| 2003/0009671 A1 | 1/2003 | Yacobi et al. | |
| 2003/0016825 A1 | 1/2003 | Jones | |
| 2003/0081779 A1 | 5/2003 | Ogino | |
| 2003/0128863 A1* | 7/2003 | Hayashi | 382/100 |
| 2003/0215111 A1* | 11/2003 | Zhang et al. | 382/100 |
| 2004/0120523 A1 | 6/2004 | Haitsma et al. | |
| 2005/0039022 A1* | 2/2005 | Venkatesan et al. | 713/176 |

FOREIGN PATENT DOCUMENTS

| | | |
|---|---|---|
| EP | 1134977 | 9/2001 |
| WO | WO-99/62022 | 12/1999 |
| WO | WO9962022 | 12/1999 |
| WO | WO0106755 | 1/2001 |
| WO | WO0203385 | 1/2002 |
| WO | WO0229510 | 4/2002 |

OTHER PUBLICATIONS

Craver, "can Invisible Watermarks Resolve Rightful Ownerships?" IBM Research Technical Report, RC 20509, 21pp. Jul. 25, 1996.

Lie et al., "Robust Image Watermarking on the DCT Domain," 2000 IEEE, I228-I231.

Tanaka et al., "Embedding the Attribute Information Into a Dithered Image," Systems and Computers in Japan, vol. 21, No. 7, pp. 43-50, 1990.

Tanaka et al., "New Integrated Coding Schemes for Computer-Aided Facsimile," Proc. IEEE Int'l Conf. On Sys. Integration, pp. 275-281, Apr. 1990.

Search Report from 02797258.7 published as EP1454219 on Sep. 8, 2004.

European Patent Application No. 02797258.7 Examination Report dated May 17, 2006.

European Patent Application No. 02797258.7 Response to Examination Report dated Nov. 27, 2006.

Boneh et al., "Collusion Secure Fingerprinting for Digital Data," Dept. of Computer Science, Princeton University, 31 pages, 1995.

Communication from the European Patent Office for European Patent Application 02797258.7, dated May 17, 2006.

Search Report for European Patent Application 02797258.7, dated Dec. 22, 2005.

Craver, et al., Can Invisible Watermarks Resolve Rightful Ownerships? IBM Research Report, RC 20509, 21 pp. Jul. 25, 1996.

Feghhi et al., Digital Certificates Applied Internet Security, 1999, ISBN 0201309807), p. 67 and 84.

Final Office Action on U.S. Appl. No. 10/017,677, mailed Aug. 14, 2007.

Final Office Action on U.S. Appl. No. 10/017,677, mailed Jan. 3, 2006.

Final Office Action on U.S. Appl. No. 10/866,172, mailed Feb. 9, 2007.

Final Office Action on U.S. Appl. No. 10/866,172, mailed Jul. 30, 2007.

Final Office Action on U.S. Appl. No. 10/866,172, mailed Sep. 1, 2006.

Final Rejection on Japanese Application 2003-553418, dispatched Aug. 17, 2010.

International Search Report for PCT/US02/39467, mailed Mar. 7, 2003.

Lie et al., "Robust Image Watermarking on the DCT Domain," 2000 IEEE, 1228-1231.

Non-Final Office Action on U.S. Appl. No. 10/017,677, mailed Jan. 9, 2007.

Non-Final Office Action on U.S. Appl. No. 10/017,677, mailed Jul. 27, 2006.

Non-Final Office Action on U.S. Appl. No. 10/017,677, mailed May 25, 2005.

Non-Final Office Action on U.S. Appl. No. 10/866,172, mailed Dec. 13, 2005.

Notice of Allowance on U.S. Appl. No. 10/017,677, mailed Feb. 15, 2008.

Notice of Allowance on U.S. Appl. No. 10/866,172, mailed Feb. 15, 2008.

Response to Examination Report on European Patent Application No. 02797258.7, dated Nov. 27, 2006.

Tanaka, et al., "Embedding the Attribute Information Into a Dithered Image," Systems and Computers in Japan, vol. 21, No. 7, pp. 43-50, 1990.

Tanaka, et al., "New Integrated Coding Schemes for Computer-Aided Facsimile," Proc. IEEE Int'l Conf. On Sys. Integration, pp. 275-281, Apr. 1990.

Examination Report issued on European Patent Application 02797258.7, mailed May 13, 2011.

* cited by examiner

DIGITAL WATERMARKING WITH VARIABLE ORIENTATION AND PROTOCOLS

RELATED APPLICATION DATA

This application is a Continuation of U.S. patent application Ser. No. 10/866,172, filed Jun. 10, 2004 (now U.S. Pat. No. 7,392,394) which is a Continuation-in-Part of U.S. patent application Ser. No. 10/017,677, filed Dec. 13, 2001 (now U.S. Pat. No. 7,392,392) and claims the benefit of U.S. Provisional Patent Application No. 60/478,386, filed Jun. 13, 2003, which are hereby incorporated by reference.

TECHNICAL FIELD

The invention relates to digital watermarking and forensic tracking of audio-visual content.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403, 6,614,914 and 6,674,876, which are hereby incorporated by reference. In this document, we use the term "watermark" to refer to a digital watermark.

In some applications, digital watermarks carry a content identifier that identifies the content (e.g., image, song, or program identifier). In such applications, each version of the content has the same watermark signal, and if two or more pieces of the content are averaged together, the watermark remains the same. This happens since two or more identical watermarks are averaged, resulting in the same watermark signal. In addition, watermark embedders in such a scheme are often designed to prevent a new content ID from being embedded over a content signal containing an existing content ID. Thus, the watermark embedder cannot be used to over-embed the existing watermark with a different content ID.

However, watermarks can be used to forensically track every place the content has been received and/or viewed by embedding a watermark at every receiving and/or viewing system that identifies that system. For example, a cable set top box (STB) can embed the 32-bit smart card ID into every premium movie received as a forensic watermark. A database protected for privacy can be maintained by the manufacturer of the smart card system that links this 32 bit ID to the user's name and address. If illegitimate movies are found by content owners, this forensic watermark can be read from these movies, and used to obtain a search warrant to obtain the user's name and address from the manufacturers database.

In this configuration, different watermarks can be embedded in identical content, and different watermarks can be embedded in one piece of content. Expanding the example above, one premium movie will have two different 32 bit IDs when received by two different STBs. Similarly, if the STBs share movies, as done with the SonicBLUE ReplayTV 4000, a movie that is sent from one STB to another can have two different forensic watermarks, known as generational forensic tracking.

As such, pirates can use averaging or over-embedding to disable watermark detection with many watermark protocols. Continuing with the above example, two or more STBs could be owned by a pirate, who averages the output video in a video mixer to remove many watermarking methods. Similarly, the pirate could pass the video sequentially through two or more STBs to stop watermark detection with many methods by overlaying several watermarks on top of each other.

The example architecture used above is applicable to broadcasts, where the forensic watermark embedder must be located in the broadcast receiver, which is usually a consumer device inside the home. For Internet streaming, the embedder can be located in the stream server since current unicast methods use point-to-point connections. Alternatively, the embedder can be located in the receiving device, once again, probably inside a PC within the consumer's home. The latter method will enable forensic tracking for multicast Internet streams.

This document describes several different methods of forensic digital watermarking. In one embodiment, an embedding method selects an orientation for a forensic digital watermark signal to be embedded in the content signal. It then embeds the forensic digital watermark signal at the selected orientation in the content signal. The embedding method applies a different orientation to the digital forensic watermark for each instance of embedding the watermark.

There are number of variations and enhancements to this method of embedding a forensic digital watermark. For example, the embedder may insert the forensic watermark for each instance of embedding using different random carrier or mapping keys, different segmenting in time for time-based content, such as audio and video, and/or different segmenting over space for space-based content, such as images and video. The variations in embedding of the forensic watermark allow several different forensic watermarks to exist in content without confusing the detector. In some embodiments, the randomization for each embedding process in these approaches improves the resistance to averaging and over-embedding attacks.

In addition, this method enables generational forensic tracking because it allows multiple forensic watermarks to co-exist in the same content signal and still be detected accurately.

The digital watermark embedding protocols can be designed such that if content is shared, causing it to be embedded with two or more forensic watermarks, the quality of the content degrades. If it requires several embedders to make the watermark unrecoverable with averaging or over-embedding attacks, the resulting content is degraded and of reduced value.

These methods, along with purely randomization of gain or location, also make it more difficult to locate watermarks in content where the watermark and payload remain constant. For this situation, the collusion attack involves averaging the content such that the watermark's energy relative to the content increases and thus, is easier to estimate. By randomizing its gain or location, the simple subtraction of the estimate from the content is not effective, because in locations where no watermark is embedded, this results in a negative watermark, which can still be read. This can be applied to audio, video, images, in time, space and/or frequency, such as, for example, randomizing location of a watermark by skipping embedding in some randomly selected video frames.

Further features will become apparent with reference to the following detailed description and accompanying drawings.

DETAILED DESCRIPTION

Figure 1:
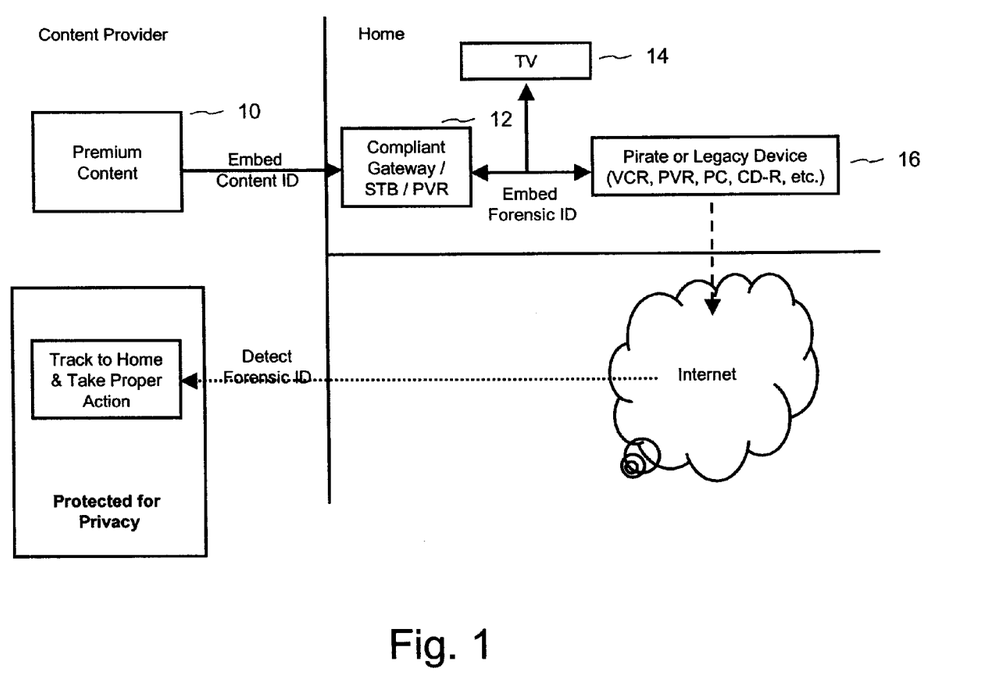
FIG. 1 shows an overview of the forensic tracking watermark application.

FIG. 1 shows an overview of the forensic tracking application for a premium TV broadcast with a soon to be common home network with personal video recording (PVR) functionality. This specific example helps describe the forensic tracking environment, but forensic tracking is applicable to many environments, including online streaming of music as provided by MusicNet and PressPlay. Premium content 10 is embedded with a content ID and broadcast to a home. The home PVR 12 embeds a forensic ID, such as a 32 bit manufacturer code and 24 bit manufacturer ID, and records the content to its hard drive. The content can be viewed on a legacy TV 14 and recorded to a legacy device 18 via a traditional analog connection. The analog connection is required for the legacy TV 14, and during analog connection, the encryption based security wrapping the content is removed. In addition, legacy device 16 does not know how to protect the content. Thus, legacy device 16 may be a PC connected to the Internet or the legacy device 18 can transfer the content to a PC. This PC can digitally compress the content and could be running file sharing software, such as KazaA, which allows others to download this premium content 10 and watch it for free since it is not protected. However, due to the watermarked forensic ID in premium content 10, content owners can download content from the file sharing network, such as KazaA, and read the watermarked forensic ID which remains in the content through analog connections and digital compression. Then, the forensic ID can be used to locate the manufacturer of the PVR 12 and search their database for the user's name and address, such that the user can be stopped from sharing copyrighted materials. This process assumes the correct privacy actions were taken within that country and state.

Some practical facts that are important in many forensic tracking watermark applications can be learned from this example. Since the embedder is located in a consumer device, the embedder must be inexpensive. The embedder must also be real-time. Since the content owner owns the detector, it can be a powerful piece of equipment that can use a lot of time and processing power to find the watermark. In addition, since there is no interactivity requirements, such as required when using a content ID for interactive TV, the speed of detection and amount of content used to detect the watermark can be large. In forensic watermark detection, the whole piece of content, such as complete song, image or movie, is expected to be available, the detector has a greater opportunity to find the forensic watermark somewhere in the content. If the entire content is not available, its value is degraded and is of less concern.

With point-to-point distribution, as currently used with Internet streaming, these requirements are similar. However, since the server knows the receiving account, the server can perform the embedding, which slightly reduces the cost requirement on the embedder.

Figure 2:
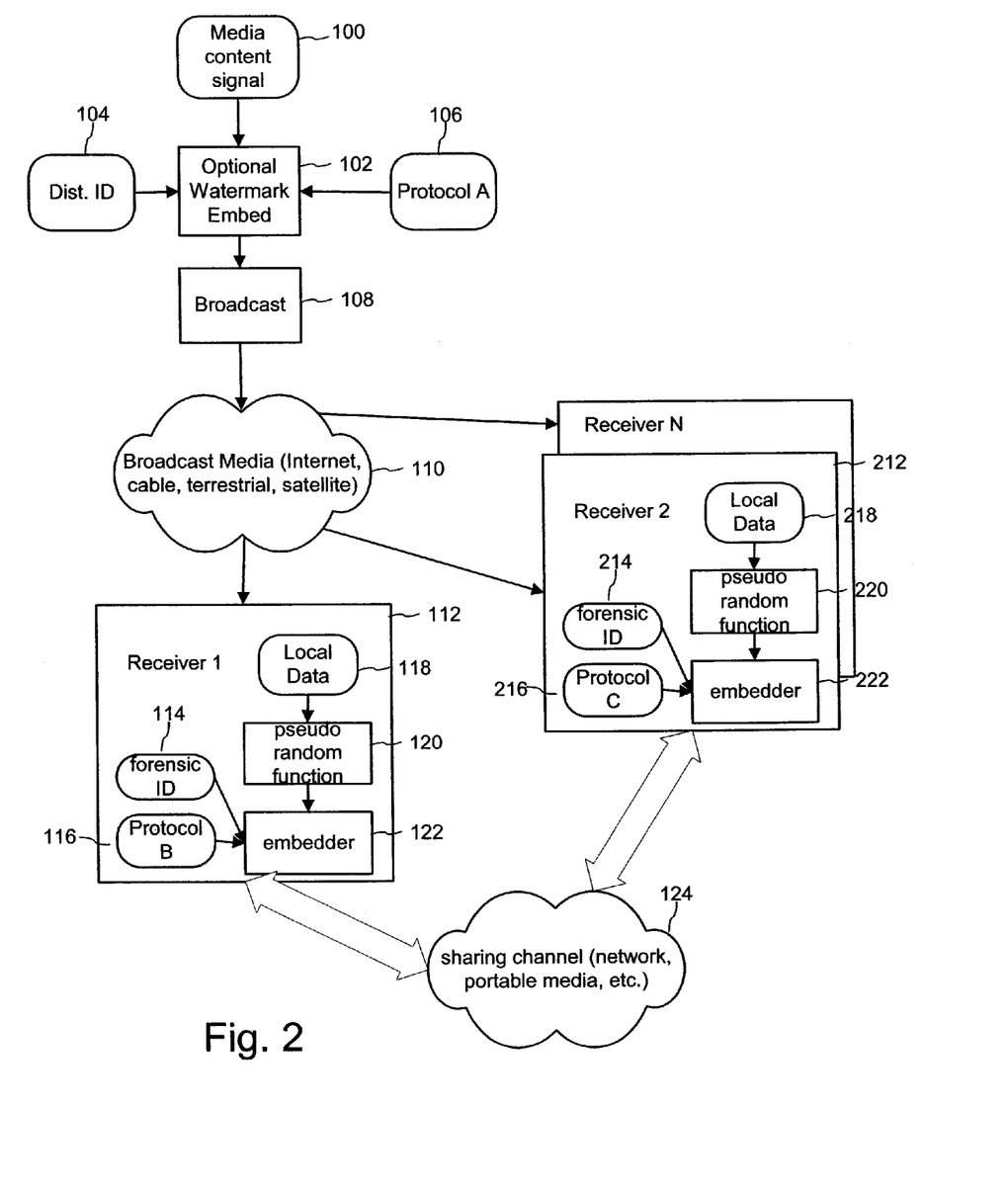
FIG. 2 illustrates a method for forensic watermark embedding in a content signal (e.g., media content signal) delivery system.

FIG. 2 illustrates a method for forensic watermark embedding in a content signal delivery system. The content delivery system delivers audio-visual content, such as videos and music to a network of receivers, such as set-top boxes, computers, televisions, etc. Since the method is generally applicable to a variety of broadcast content, FIG. 2 represents the content generally as a "media content signal" 100. This signal represents a content title, such as a program, movie, or song.

At the broadcast side of the system, the broadcaster may optionally perform a watermark embedding operation 102 on the signal 100 to add a distributor identifier (ID) 104 according to an embedding protocol 106. The protocol specifies parameters of the digital watermark embedding operation, such as a carrier key used to modulate the message payload of the watermark, and a mapping key to map the message payload to features or samples of the host content signal. One example of carrier key is a pseudorandom number that acts as a carrier signal for the message payload. The message may modulate the carrier using a variety of techniques, such as XOR, multiplication, convolution, phase shifting the carrier, adding shifted versions of the carrier together, etc.

One example of a mapping key is a table that specifies a relationship between message symbols of the message payload and corresponding samples or features of the host signal that will be modified to embed those symbols.

The digital watermark, in addition to carrying the message payload, includes a synchronization or calibration component that enables its detection in a potentially corrupted version of the content signal. This component is an attribute of the watermark, such as peaks in a particular transform domain (e.g., the autocorrelation or Fourier domain), a sequence or pattern of known message symbols, or some combination. The synchronization component enables a detector to search through a corrupted signal and identify the presence and origin of a watermark, and in some cases, temporal and spatial distortion of the signal. The synchronization component may be signal peaks or pattern of the carrier key, signal peaks or pattern formed by mapping symbols to the host via the mapping key, or some independent signal component with known peaks or a pattern that assists in detection.

The distributor ID identifiers the source of the broadcast. This might include, for example, a cable service provider, a subscription service provider, broadcaster, etc. The embedding of this distributor ID is illustrated as optional at the broadcaster because it is not a necessary component of forensic tracking functions, and in any event, may be embedded at the receiver side or identified using an out-of-band metadata associated with the content signal.

The broadcaster 108 distributes the content signal to two or more receivers 112, 212 (Receiver 1, 2, ... N) over a broadcast medium 110. This medium may be a conventional terrestrial broadcast carrier, a satellite broadcast, cable broadcast, Internet download or multicast, etc.

Forensic tracking is enabled when the receivers embed a forensic watermark in the content titles they receive. This forensic watermark is associated with a particular receiver through a forensic ID. The forensic ID, in particular, is encoded into a variable message payload of the forensic watermark. In addition, the forensic ID is associated with the receiver device. This device may be a set top box, personal video recorder, television, etc.

Generational forensic tracking is enabled when a subsequent receiver of the media content signal embeds another layer of its forensic watermark in the content signal as it is passed from one receiver device to another. For example, networked devices like computers, set-top boxes, and PVRs enable users to transfer copies of the content signal to each other. Upon receipt of the copy, the receiver embeds its forensic watermark. This process adds another layer of forensic watermark, each providing a reference to the receiver device.

To minimize interference between watermark layers and make the forensic watermark robust to averaging attacks, the receivers select an embedding protocol and/or embedding orientation that varies from one receiver to the next. Defined previously, the embedding protocol may include a different carrier signal, such as a pseudo random number sequence orthogonal to the carrier of one or more of the carriers in other protocols. The protocol may also include a different mapping function, which maps the watermark message symbols to different locations or features within the host media content signal.

Signal "features" in this context are particularly relevant in watermarking techniques that modulate features of the host signal to encode the message symbols of the forensic watermark. Some examples of such an embedding technique include setting features like auto-correlation, power, intensity, frequency coefficients, spatial domain objects to a particular value corresponding to a symbol to be embedded.

The embedding orientation refers to the spatial, temporal or frequency domain location of the forensic watermark signal. In an audio-visual work, such as a movie with a sound track, the spatial location refers to some spatial location in selected spatial area, e.g., a matrix of pixel block locations (e.g., every fifth 128 by 128 pixel block in a frame). The watermark can use all of the pixels in the frame, where the origin is randomly chosen and the watermark is wrapped around the edges of the frame. Thus, each instance of a forensic watermark layer completely overlaps, but does not interfere since the protocols are not perfectly aligned. Alternatively, a portion of the frame can be used as the matrix of pixels used to carry the watermark. In this case, different watermarks may or may not overlap.

The temporal location refers to the watermark's orientation over the time of the content with a temporal component, such as audio or video. As described for spatial location, the watermark embedding method can use the whole duration of the audio or video, with different beginning orientation, or the watermark embedding method can use time segments of the content, such as a frame or frames of video or a clip of audio having a pre-determined duration. The different beginning orientation can include leaving a small portion of the content un-watermarked at the beginning or wrapping the watermark around the content such that the beginning of the content contains the end of the watermark data payload. Once again, with different beginning orientation, each watermark layer completely overlap but with different alignment of the carrier signals which reduces interference. When using time segments, each watermark layer, may or may not overlap.

The frequency location refers to a selected orientation of watermarks within the complete frequency range of the content, or a set of frequency coefficients or frequency band. This may be the spatial frequency of a frame of video or an image, a frequency band of a clip of audio, or temporal frequency of a set of frames of video. When using a frequency band, the frequency bands may be preset and the embedder chooses from this set or the range is preset and the embedder chooses the actual coefficients to match that range. Some forensic watermarking techniques can vary the frequency band range, too. The potential overlap of each watermark layer is the same as described above, but, most importantly, the alignment is different and interference among different forensic watermarks is greatly reduced.

The embedding orientation is preferably related to the mapping key of the protocol such that the mapping key specifies an allowed set of possible orientations for a particular device or class of devices, while the orientation selected at a particular instance of embedding the forensic watermark in the device is selected from among that allowed set. The orientation may be pseudo randomly selected from among options specified in the allowed set of orientations. When different orientations are used, the same modulation functions do not have as much interference as when they are perfectly overlapped. Specifically, with spread-spectrum techniques that use pseudo-random noise (PN) sequences, if the PN sequences are not perfectly aligned they will not interact. This occurs by definition of a PN sequence since each point is independent of the other point. To avoid interference, different PN sequences can be used for the carrier key.

To illustrate how the embedders vary the protocol and/or orientation, it is useful to refer to the example in FIG. 2. As shown, each receiver includes a forensic watermark embedder 122, 222 that imperceptibly embeds a forensic ID 114, 214 in a digital watermark carried in the media content signal following a protocol 116, 216. In FIG. 2, the receivers employ different embedding protocols (shown as protocol B and C). In addition, or in the alternative, the receivers embed the forensic watermarks at a different orientation.

In one implementation, each embedder is pre-specified with its own unique protocol. In this implementation, the interaction of two embedders is minimized, but if two devices have overlapping protocols, they interfere with each other. In order to make sure two embedders do not interfere with each other, a central database needs to be maintained and protocols assigned using the central database to ensure embedders will have non-interfering protocols.

In another implementation, each embedder varies the embedding for each instance of a particular content item by selecting a different protocol and/or orientation. This means that two embedders may interfere in one segment of content, but not with other content nor other segments. In other words, collusion or collage attack will require more embedders to be successful, thus increasing the cost and degrading the content. One way to select the protocol and orientation is to select each from an allowed set using a pseudo random function 120, 220. For example, the protocol may have an allowed set of 1000 carrier keys, or 1000 mapping functions. Additionally, each embedder may include an allowed set of N orientations. As noted, these orientations may be a function of the mapping key, where each mapping key has an allowed set of orientations. In the example shown in FIG. 2, this pseudorandom function varies according to local data, such as the time or date, which changes from one instance of embedding the forensic watermark to the next.

Preferably, the embedders vary the forensic watermark from one device to another in a manner that reduces the effectiveness of averaging attacks. By using protocols and/or orientations that reduce interference between different forensic watermarks, the impact of averaging copies of a content signal with different forensic watermarks is diminished. Certain aspects of the forensic watermark, such as the synchronization component may be similar for each copy, and therefore, averaging has little or no impact on it.

A specific example is as follows. Assume an embedder requires 1 second to embed the forensic ID. If the embedder embeds the forensic ID once on average in every 30 seconds of audio or video content, using a Poisson probability process or Gaussian distribution, where the starting seed is different for each piece of content and embedder, such as basing the starting seed on an embedder ID and current time with millisecond accuracy, the interaction of two embedders in 3 minutes of content, the length of many songs, or 90 minutes of content, the length of many movies, is very unlikely.

Similarly, the location within an image or frame of a video can be randomly chosen. Or the orientation of the carrier signal can be randomly chosen.

Combining the above example approaches with choosing from a different set of random watermark carrier signals, the interference of several forensic watermarks becomes unlikely. Thus, improving robustness to averaging and over embedding attacks.

Another advantage of the variable embedding approach is that it enables generational tracking where forensic watermarks are layered onto each other in a content signal as it moves from one device to the next. Since the variable embedding reduces interference between different forensic watermarks, multiple watermarks may be embedded with less impact on detectability of each.

Figure 3:
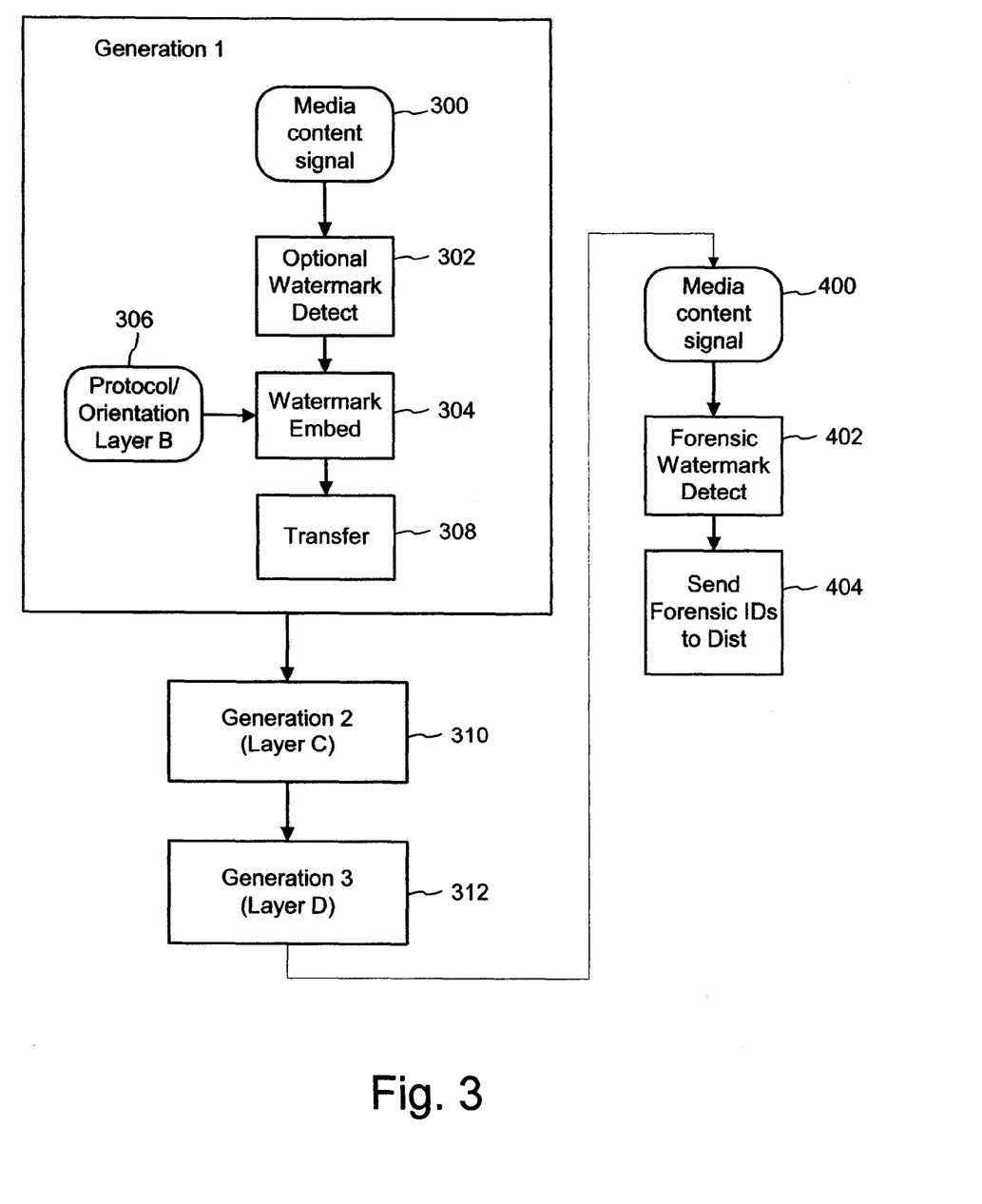
FIG. 3 illustrates a method for generational tracking of content using digital watermarking.

Generational tracking can be enabled with standard non-variable embedding methods, by knowing or detecting the presence of a watermark layer and choosing a new watermark layer that has specifically been designed with a different non-interfering protocol. However, although this method is optimal in many situations, for many forensic tracking applications where the embedder is located in the consumer device, this method requires the embedder to also detect the watermark, thus increasing its cost. Even for server based forensic tracking embedders used in Internet streaming, the cost is a large requirement. To this end, the variable embedding approach enables generational forensic tracking at a reduced cost FIG. 3 illustrates a method for generational tracking of content using digital watermarking. This diagram shows an example where a media content signal 300 passes through three receivers, each time receiving a forensic watermark associated with that receiver. Optionally, the receivers may include a watermark detector 302 to detect a previous layer or layers of forensic or distributor watermarks. This enables the embedder to select a watermark orientation and/or protocol that minimizes interference with existing watermark layers. However, if properly designed, interference will usually be minimal, and thus, a detector is not necessary.

The watermark embedder 304 embeds a forensic watermark ID according to the local protocol (306, protocol B) in the device. In one implementation, the embedding operation modulates the forensic ID with a pseudo random number serving as the carrier key, and maps the resulting signal to block locations within frames of the content signal. This intermediate signal is then embedded in corresponding samples according a perceptual masking function and embedding function that adjusts the samples in a manner that encodes the modulated signal at strength commensurate with the masking capability measured by the masking function.

As shown in block 308, the first generation device then transfers the signal to some shared channel, such as portable memory device, networked storage location, etc. Subsequent generations 310, 312 within different receivers perform the same functions to embed additional layers of forensic watermarks.

The above application of forensic watermarking preferably uses a computationally efficient method of embedding so that it can be implemented in receivers, such as set-top boxes, PVRs, PCs, etc. with minimal interruption of the normal processing flow of content signals. Preferably, the receiver device embeds the forensic watermark in the content as it is being stored in the device. Alternatively, it is embedded as it is received in the device.

In one implementation for video, the embedder employs a version of the embedding technique described in U.S. Pat. Nos. 6,122,403 and 6,614,914. The embedder generates an error correction encoded binary antipodal sequence corresponding to the forensic ID, spreads each bit of this sequence over a PN binary antipodal carrier key by multiplying each bit with the corresponding carrier key to form an intermediate signal, and maps elements of the intermediate signal to locations within selected blocks of the video. A perceptual analysis calculates data hiding capacity as a function of local spatial and temporal signal activity. This analysis produces a mask of gain values corresponding to locations with the host signal used to control embedding of the intermediate signal into the host signal. The gain values adjust the strength of the intermediate signal at the corresponding locations in the host signal. To complete embedding, the embedder adjusts the level of the host signal according to the corresponding value of the intermediate signal and the gain value.

For synchronization, a known pattern is mapped to locations within the host signal. This known pattern exhibits peaks in the Fourier domain that enable detection and synchronization. This synchronization signal may be an integrated component of the carrier key and/or a separate signal component. The perceptual mask applies to this component as well.

Due to the nature of the application, the computational complexity of the forensic watermark detector is less of a constraint for the system design. Forensic analysis of a media content signal may be performed off-line in a powerful server computer or even invoke parallel processing across multiple computers or processors.

Typically, in a forensic watermark application, the content owner or distributor monitors for illegal distribution of its content. This may include manual searching or automatic searching on the Internet, in unauthorized file sharing systems, etc. When a suspect content title is found, the suspect media signal 400 is input to a forensic watermark detector 402 as shown in FIG. 3.

First, the detector searches for the synchronization signal, using, for example, a correlation function to detect the synchronization peaks and/or pattern. Different protocols may use the same or different synchronization signal. If separate, the detector iterates through possible synchronization signals to detect the presence of forensic watermarks.

Once synchronized, the detector proceeds to extract the digital watermark payload by estimating the values of the intermediate signal, combining the estimates for each error correction encoded bit according to the mapping function, and then performing inverse error correction coding to recover the forensic ID.

The detector may use a similar approach to extract a distributor ID, if one exists, along with any other forensic IDs. The distributor ID can be used to provide a pointer to the distributor. In this case, the detector sends a list of the forensic IDs found to the distributor as shown in block 404 of FIG. 3, along with a content ID identifying the content title.

For certain aspects of this variable embedding approach, there are cost tradeoffs. For example, increasing the number of carrier keys or mapping keys increases the cost in both the embedder and detector. The embedder must store these keys and the detector must be capable of detecting forensic watermarks using these keys. However, changing the watermark's orientation, such as over time, location, and frequency, there are minimal cost increases to the embedder.

In addition, it may be optimal if each forensic tracking watermark is embedded at a maximum strength. In other words, if the strength of the watermark is increased, its perceptibility, such as visibility in images and video or audibility in audio, is unacceptable. This process can be optimal since adding watermark layers will degrade the content in similar fashion to increasing the strength. However, due to the independence of each watermark layer, the degradation of the content will usually happen at a slower rate than increasing the amplitude of the carrier for a single watermark layer. In the end, the collage or collusion attack results in degraded, less valuable content. This must be balanced with the desires of generational tracking. For example, three generations may be all that the content owner wants to enable. As such, the fourth watermark layer can produce objectionable degradation, which means that a collusion or collage attack requiring four or more embedders is minimally effective. In another example, the content owner may not want to enable file sharing, and as such, it is acceptable if two watermark embedders produce content degradation.

Figure 4:
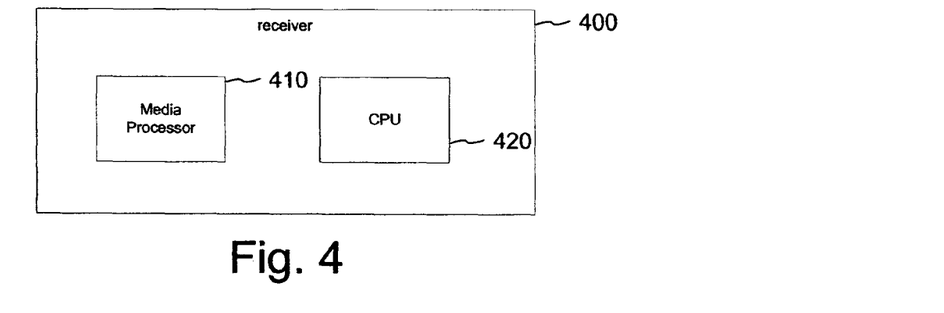
FIG. 4 illustrates a video set top box system with a forensic watermark embedder.

FIG. 4 shows an apparatus for embedding forensic watermarks in a broadcast environment. The receiver 400, which may be a STB and/or PVR for television or a tuner for radio, receives the broadcast signal and embeds the watermark. For TV, most STBs and PVRs include a media processor 410 to handle the content and a CPU 420 to handle the interactivity. The watermark embedder can be software running on the media processor 410 or CPU 420, hardware integrated with either component, assuming the CPU can access the content stream, or a stand alone hardware chip integrated with the receiver. For radio, the receiver architecture is currently simpler, and the forensic embedder will probably be a stand-alone hardware chip. If radio moves to include more interactivity, such as with digital satellite radio, the configuration may become closer to that of TV.

Figure 5:
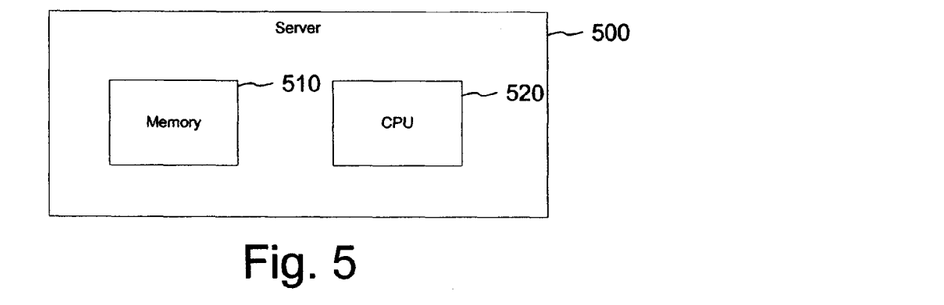
FIG. 5 illustrates an Internet server with a forensic watermark embedder.
Figure 6:
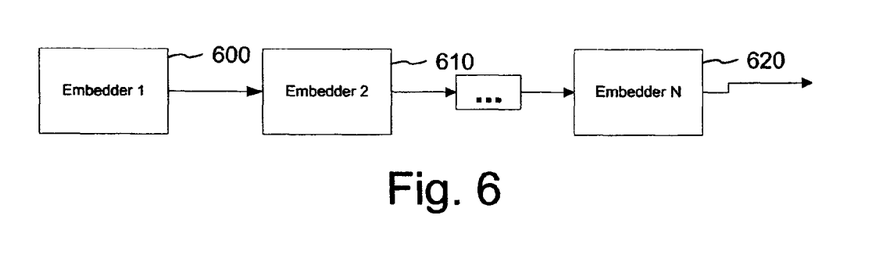
FIG. 6 illustrates the configuration of forensic watermarking embedders for collage attack.

FIG. 5 shows an apparatus for embedding forensic watermarks in a point-to-point Internet streaming environment, either for audio or video. An Internet streaming server 500 can embed the watermark. The server 500 is usually a PC or PC-like device that includes memory 510 and CPU 520. The memory 510 can be used to store the watermarking protocol and CPU 520 can be used to use the watermarking protocol to embed the forensic watermark with the forensic ID that identifies the receiving client software of the stream and the manufacturer of the client software. FIG. 6 shows the configuration of forensic watermark embedders for the collage attack. This configuration assumes the consumer device includes the forensic watermark embedder as required for broadcasts and Internet multi-casts, but is not required for Internet unicasts. Several embedders, such as embedder-1 600, embedder-2 610, and so on to embedder-N 620, are configured in series so that each embedder adds a different forensic watermark to the content. The goal is that the content coming out of Embedder-N 620, as represented by the arrow, is of reasonable quality and has so many watermarks that the detector cannot read any forensic watermark. With television, each embedder could be a STB or PVR.

Figure 7:
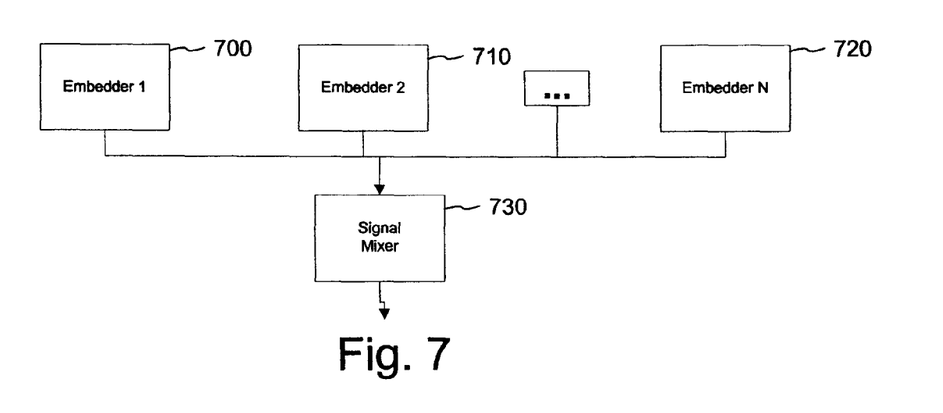
FIG. 7 illustrates the configuration of forensic watermarking embedders for collusion attack.

FIG. 7 shows the configuration of forensic watermark embedders for the collusion attack. This configuration assumes the consumer device includes the forensic watermark embedder as required for broadcasts and Internet multi-casts, but is not required for Internet unicasts. Several embedders, such as embedder-1 700, embedder-2 710, and so on to embedder-N 720, are configured in parallel, and connected to a content mixer 730 such that each embedder adds a different forensic watermark to the content and the mixer averages all of these watermarks. The goal is that the content coming out of mixer 730, as represented by the arrow, is of reasonable quality and has so many watermarks that the detector cannot read any forensic watermark. With television, each embedder could be a STB or PVR, and the signal mixer could be a profession video mixer. The mixer could also easily be done as a custom program on a PC with a video capture and production board. For Internet streaming of audio or video, the embedders could be located within several PCs, each with its own receiving client, or several clients on one PC.

As noted above, one way to thwart averaging type attacks is to vary the watermark in the content item, such as varying the watermark over time and/or space. This applies to averaging attacks made within a content item with identical watermarks as well as between copies of a content item with different watermarks. Averaging attacks within a content item particularly relate to watermarks that are repeated within the content item, enabling the repeated part (in this case the watermark) to be estimated and the varying part (e.g., time varying content and time varying watermarks) to be diminished due to constructive interference. As noted, varying the watermark over time/space presents a challenge to this form of averaging attack. The attacker needs to make an accurate estimate of the watermark (e.g., including its location and magnitude) to be able to reduce or remove it. Even if the attacker is able to accurately estimate a watermark (or portion of it) through averaging, the process of subtracting the watermark can actually have the effect of adding it to the content item. This may happen, for example, where the watermark amplitude or location has not been correctly estimated. Even if this inverts the watermark, many systems are robust to inversion because the sign of the watermark is immaterial to detection (watermark signal with different signs at a particular orientation yield the same message), or they simply have a mechanism for checking for inverted watermarks (only one instance of the inverted or non-inverted watermark yields a successful detection using error correction/error detection process).

It should be clear that to further thwart this type of sophisticated attack, the embedder is designed to make the gain of the watermark pseudo- or purely-random. Consider the case where the watermark is computed as a modulated pseudorandom signal, which is then used to modify elements of the host (possibly using a combination of informed embedding and perceptual masking). The watermark is designed to be detected even where a small amount of purely random gain is applied. Places where the random gain is zero lead to absence of the watermark, and is equivalent to skipping that segment.

In this case, there is no need to distribute this purely random gain to the detector, even in secret, because it is not needed for detection or message extraction. More specifically, in some cases, tile or segments of content is averaged by the detector to improve robustness. For this method, some segments or parts of segments will have no or less watermark, and the result is a detectable watermark that may have less robustness. This additional layer of randomness on the watermark signal structure makes it even more difficult to estimate the watermark signal amplitude, and as such, makes it more difficult to subtract the watermark perfectly. Without perfect removal of the watermark, detectable remnants of it remain, even after such a sophisticated attack.

As note above, this random gain technique can be applied to spatial, frequency or any transform domain based watermark, for any content, such as but not limited to audio, video and images. In audio, the technique can be applied over time, frequency or time-frequency. In video, the technique can be applied over time, space, time-space, spatial frequency, time-spatial frequency, temporal frequency, and/or space-temporal frequency. Space can include part or a whole video frame, and time can include 1 or more video frames. In images, the technique can be applied over spatial or spatial frequency, such as skipping a tile of an image. When dealing with frequency, it can be used for each frequency representation of a sample (e.g., pixel) or group of frequency samples, such as frequency bands. In audio, the frequency bands can be logarithmically spaced to match perceptual characteristics.

This purely random gain can be extracted from a non-deterministic noise source in the device, such as from the device electronics (e.g., thermal noise). This noise source can provide the subtle random signal amplitude or gain such that the watermark has another element of variation over time (frames, time blocks, blocks of frames, etc.), space (pixels, pixel blocks, frames, and/or other dimensions of the watermark signal vector (e.g., color space, feature set mapping, etc.)

Though perhaps less secure, a pseudo random gain based on a deterministic noise source seeded by a known key may also be used. This seed or key need not be distributed to protect its secrecy.

However, sophisticated attackers may attempt to use techniques to deduce the amplitude of the watermark, such as by using an entropy filter once they have deduced the key and/or protocol that provides the watermark location and general signal structure. This can be made more difficult by making the watermark vary with changes in the content using perceptual masking and/or making the watermark content dependent in other ways (e.g., through informed embedding that adjust the host signal as a function of its starting state and a key, not just a key). Nevertheless, knowledge of the watermark embedding method, including perceptual masking and the nature of the informed embedding scheme, can enable the attacker to deduce the watermark signal amplitude more accurately.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of digital watermarking comprising:
receiving a media content signal;
generating a mapping for a digital watermark to be embedded in the media content signal, wherein the digital watermark is unique to a particular copy of the media content signal, wherein the mapping specifies a mapping of elements of the digital watermark to a pattern of samples in the media content signal, and wherein the mapping is generated as function of a variable associated with the distribution of the copy; and
embedding, using a processor, the digital watermark at the generated mapping in the media content signal, wherein the embedding comprises applying a different mapping for different copies of the media content signal, wherein the different mappings are based on unique information associated with the copies, and wherein a random amplitude gain is applied to the digital watermark to vary the presence of the digital watermark.

2. The method of claim 1, wherein the variable comprises time or date.

3. The method of claim 1, wherein the variable comprises an input to a pseudo-random.

4. The method of claim 1, further comprising embedding the digital watermark in an internet server when the different copies are distributed.

5. The method of claim 4, wherein the digital watermark comprises a distributor identifier, and wherein the digital watermark is unique to each of the different copies.

6. The method of claim 1, wherein the samples comprise frequency domain samples.

7. The method of claim 1, further comprising adjusting the samples as a function of a starting state of the samples and as a function of a key.

8. An electronic device, comprising:
a memory configured to store a media content signal; and
a processor operatively coupled to the memory and configured to:
receive the media content signal;
generate a mapping for a digital watermark to be embedded in the media content signal, wherein the digital watermark is unique to a particular copy of the media content signal, wherein the mapping specifies a mapping of elements of the digital watermark to a pattern of samples in the media content signal, and wherein the mapping is generated as function of a variable associated with the distribution of the copy; and
embed the digital watermark at the generated mapping in the media content signal, wherein the embedding comprises applying a different mapping for different copies of the media content signal, wherein the different mappings are based on unique information associated with the different copies, and wherein a random amplitude gain is applied to the digital watermark to vary the presence of the digital watermark.

9. A non-transitory computer readable medium having instructions stored thereon, the instructions comprising:
   instructions to receive a media content signal;
   instructions to generate a mapping for a digital watermark to be embedded in the media content signal, wherein the digital watermark is unique to a particular copy of the media content signal, wherein the mapping specifies a mapping of elements of the digital watermark to a pattern of samples in the media content signal, and wherein the mapping is generated as function of a variable associated with the distribution of the copy; and
   instructions to embed the digital watermark at the generated mapping in the media content signal, wherein embedding comprises applying a different mapping for different copies of the media content signal, wherein the different mappings are based on unique information associated with the copies, and wherein a random amplitude gain is applied to the digital watermark to vary the presence of the digital watermark.

\* \* \* \* \*

UNITED STATES PATENT AND TRADEMARK OFFICE
CERTIFICATE OF CORRECTION

PATENT NO.         : 8,234,495 B2            Page 1 of 1
APPLICATION NO.    : 12/145373
DATED              : July 31, 2012
INVENTOR(S)        : Levy It is certified that error appears in the above-identified patent and that said Letters Patent is hereby corrected as shown below:

On Page 2, in Field (56), under "OTHER PUBLICATIONS", in Column 2, Lines 23-24, delete "Craver, et al., Can Invisible Watermarks Resolve Rightful Ownerships? IBM Research Report, RC 20509, 21 pp. Jul. 25, 1996.".

On Page 2, in Field (56), under "OTHER PUBLICATIONS", in Column 2, Lines 57-59, delete "Tanaka, et al., "Embedding the Attribute Information Into a Dithered Image," Systems and Computers in Japan, vol. 21, No. 7, pp. 43-50, 1990.".

On Page 2, in Field (56), under "OTHER PUBLICATIONS", in Column 2, Lines 60-62, delete "Tanaka, et al., "New Integrated Coding Schemes for Computer-Aided Facsimile," Proc. IEEE Int'l Conf. On Sys. Integration, pp. 275-281, Apr. 1990.".

In Column 11, Line 14, delete "note" and insert -- noted --, therefor.

In Column 12, Line 35, in Claim 3, delete "pseudo-random." and insert -- pseudo-random function. --, therefor.

Signed and Sealed this
Fifth Day of February, 2013

Teresa Stanek Rea
*Acting Director of the United States Patent and Trademark Office*